United States Patent [19]

Kaneishi et al.

[11] Patent Number: 5,403,647
[45] Date of Patent: Apr. 4, 1995

[54] INJECTION-MOLDED ARTICLE HAVING HIGH-QUALITY APPEARANCE

[75] Inventors: Akimasa Kaneishi; Akinori Toyota, both of Hiratsuka, Japan

[73] Assignee: Mitsubishi Gas Chemical Company, Inc., Tokyo, Japan

[21] Appl. No.: 983,755

[22] Filed: Dec. 1, 1992

[30] Foreign Application Priority Data

Dec. 2, 1991 [JP] Japan ................................. 3-318202

[51] Int. Cl.$^6$ ............................................... B32B 3/00
[52] U.S. Cl. ..................................... 428/156; 428/167; 428/188; 428/212; 428/213
[58] Field of Search ..................... 428/188, 156, 34.1, 428/167, 131, 192, 212, 213, 332, 304.4; 49/498.1; 264/512, 515

[56] References Cited

U.S. PATENT DOCUMENTS 4,923,666  5/1990  Yamazaki et al. .................. 284/572

FOREIGN PATENT DOCUMENTS 2158002  11/1986  United Kingdom .

OTHER PUBLICATIONS

Patent Abstracts of Japan, vol. 016, No. 290 (M-1272) Jun. 26, 1992 (Abstract of JP-A-04078511).
Plastics Engineering, vol. 45, No. 7, pp. 35–38 (1989).
Patent Abstracts of Japan, vol. 016, No. 127 (M-1227) Mar. 31, 1992 (Abstract of JP-A-03290216.
B. Klotz et al., Kunststoffe German Plastics, vol. 79, No. 11, pp. 1102–1104 (1989) with English Translation.
C. Haroschek, Malterdingen, Kunststoffe German Plastics vol. 80, No. 8, pp. 873–876 (1990) with English Translation.
Ed Galli, Plastics Design Forum, pp. 35, 36, 41 and 42 (1990).

Primary Examiner—Donald J. Loney
Attorney, Agent, or Firm—Wenderoth, Lind & Ponack

[57] ABSTRACT

An injection-molded article of a thermoplastic resin having a base body defining an outer shape of the injection-molded article, a thick-wall portion rising from the base body, and a foot portion formed on the base body and at a foot of the thick-wall portion, the foot portion rising from the base portion, having a thickness which gradually increases toward the thick-wall portion, and having a (maximum thickness of the foot portion)/(width extending from the thick-wall portion to an end of the foot portion) ratio of 1/40 to ½, at least the thick-wall portion having a hollow portion.

4 Claims, 11 Drawing Sheets

INJECTION-MOLDED ARTICLE HAVING HIGH-QUALITY APPEARANCE

BACKGROUND OF THE INVENTION AND RELATED ART

The present invention relates to an injection-molded article which has a hollow portion and satisfies the requirement for a high-quality appearance.

Exterior parts of an automobile and housings and covers of business machines and electric household appliances (to be generically referred to as a "product" hereinafter) are required to have high-quality appearances. These products are generally produced by injection molding, and they have base bodies defining their shape which have flat and/or curved surfaces, bent portions, corner portions and so on. Further, these products sometimes have rib-shaped thick-wall portions which are integrally formed with their base bodies to strengthen the base bodies as required. In this case, however, a so-called sink mark generally appears on that surface of the base body which is opposite to the thick-wall portion (to be sometimes simply referred to as a "product surface" hereinafter), and the resultant product has not an excellent appearance.

For preventing the occurrence of the sink mark, there is known a so-called gas injection molding method in which a pressurized gas is introduced into a molten resin after or while the molten resin is injected into a cavity of a mold, as is disclosed in JP-A-63-268611 (corresponding to U.S. Pat. No. 4,923,666) for example. In this gas injection molding method, a molded article has a rib-shaped thick-wall portion or a thick-wall corner portion, and a hollow portion is formed in the thick-wall portion or the thick-wall corner portion.

When the product is produced according to the above gas injection molding method, for example, the hollow portion is formed in the thick-wall portion having a larger width and a larger height than a thickness of a base body. FIGS. 17A, 17B and 17C show schematic cross sections of such products. In each of FIGS. 17A, 17B and 17C, numeral 10 indicates a base body, 20 indicates a thick-wall portion, and 30 indicates a hollow portion. The hollow portion 30 is formed generally at the foot of the thick-wall portion 20, and it sometimes extends into the base body 10.

The hollow portion can be formed by the following steps. After or when a molten resin is injected into a cavity of a mold, a pressurized gas is introduced into that part of the molten resin which corresponds to the hollow portion of the thick-wall portion. Then, the pressure of the pressurized gas is maintained until the molten resin is solidified and cooled in the cavity, whereby the hollow portion is formed in the thick-wall portion. Further, since the pressurized gas keeps on pressing the resin to the inner wall of the cavity while the molten resin is solidified and cooled, it is possible to prevent the occurrence of the sink mark on that surface 12 (product surface) of the base body which is opposite to a portion where the thick-wall portion is formed.

When the product is produced by the gas injection molding method as described above, the sink mark can be prevented from being formed on the surface 12 (product surface) of the product opposite to the thick-wall portion, and the base body can be imparted with high strength due to the thick-wall portion. Moreover, the overall weight of the product can be decreased due to the hollow portion formed in the thick-wall portion. Therefore, the gas injection molding method is often employed for producing various parts of an automobile and parts of business machines and an electric household appliance.

A technique for forming an injection-molded article by the gas injection molding method to prevent the occurrence of a sink mark on a product surface opposite to a portion where a rib is formed is also disclosed in "Gasinnendruck zum Ausblasen überschüssiger Schmelze", Kunststoffe 80 (1990) 8, pp. 873–876, "Neue Möglichkeiten beim Spritzgießen durch das Gasinnendruckverfahren", Kunststoffe 79 (1989) 11, pp. 1102–1107, or "Gas injection finally freed for growth", EUROPEAN PLASTICS NEWS, May 1991, pp. 61–85.

Further, "Design guidelines for gas injection molding", PLASTIC DESIGN FORUM, July/August 1990, pp. 41, describes a thick-wall portion of a molded article formed by a gas injection molding method. This molding article has a rib projecting from a base body and a thick-wall portion formed between the rib and the base body. This article discloses many design examples of the shapes of the thick-wall portions.

However, when any one of the above gas injection molding methods is employed for molding the product, a strain on the base body is sometimes observed. The strain occurs on a surface opposite to an interface between the thick-wall portion and the base body where the thick-wall portion is formed (to be sometimes referred to as "product surface portion" hereinafter), and this strain in the form of a continuous linear, very small groove is observed on the product surface portion along the circumference of a foot portion of the thick-wall portion. This strain can be identified by observing a distortion of an image reflected on the surface of the product. Such a strain does not specially matter when a product is used as an interior fitting part of an automobile and a functional part or a general cover of a business machine and electric household appliances.

However, when it comes to a variety of exterior parts of an automobile and a housing and a special cover of a business machine and an electric household appliance which are required to have high surface smoothness or an excellent appearance, for example, a strain having a depth of about 3 μm and a width of about 5 mm causes a defective appearance if it occurs on the product surface portion. In particular, even a slight strain can be observed, if the product is a molded article formed from a resin having gloss or a molded article coated with a coating composition having gloss.

A molded article produced by any one of the above gas injection molding methods sometimes shows a slightly irregular color on the product surface portion. When a molten resin is injected and when a pressurized gas is introduced, the molten resin flows from a mold cavity portion corresponding to the thick-wall portion to a mold cavity portion corresponding to the base body. In this case, the flowing state of the molten resin greatly changes, and the flow of the molten resin relative to a cavity wall surface is disordered. As a result, a molded article shows some haze, which is called irregular color.

The above irregular color (non-uniformity in color) is observed in the form of a continuous line or a spread on the product surface portion along the circumference of a foot portion of the thick-wall portion. In exterior fitting parts of an automobile or housings or covers of business machines or an electric household appliance which are required to have a high-quality appearance, the above irregular color results in a defective appearance.

In view of a strain or an irregular color, it is very difficult to apply conventional gas injection molding methods used to remove a so-called sink mark to the production of a product required to have a special high-quality appearance.

OBJECTS AND SUMMARY OF THE INVENTION

It is an object of the present invention to provide a molded article having an appearance of very high qualities, more specifically, an injection-molded article free of a strain and an irregular color on its surface.

According to the present invention, the above object is achieved by an injection-molded article having a base body defining an; outer shape of the injection-molded article, a thick-wall portion rising from the base body, and a foot portion formed on the base body and at a foot of the thick-wall portion, the injection-molded article formed by injection-molding a thermoplastic resin, the foot portion rising from the base portion, having a thickness which gradually increases toward the thick-wall portion, and having a (maximum thickness of the foot portion)/(width extending from the thick-wall portion to an end of the foot portion) ratio of 1/40 to $\frac{1}{2}$, at least the thick-wall portion having a hollow portion.

The (maximum thickness of the foot portion)/(width extending from the thick-wall portion to an end of the foot portion) ratio (hereinafter referred to as "maximum thickness/width ratio") of the foot portion is preferably 1/20 to $\frac{1}{4}$. When the maximum thickness/width ratio of the foot portion is less than 1/40 or more than $\frac{1}{2}$, the product surface portion may have a strain or an irregular color due to a great change in the flow of a molten resin in a mold cavity.

The above maximum thickness of the foot portion is defined as follows. To explain the thickness and width by reference to a cross-sectional view of FIG. 1B, for example, a perpendicular line is drawn from a portion 42, where the surface of the thick-wall portion meets the surface 44 of the foot portion, to the outer surface of the base body (a point where the perpendicular line meets with the outer surface of the base body 10 is indicated by numeral 42A). A thickness, t, defined below is deducted from the length of the perpendicular line to give the maximum thickness of the foot portion. The thickness, t, is a thickness of that portion 14 of the base body where the foot portion starts to rise. The above portion indicated by numeral 42 is sometimes referred to as a cross portion.

The above width extending from the thick-wall portion to an end of the foot portion (hereinafter referred to as "width of the foot portion") is defined as follows. A perpendicular line is drawn from the cross portion 42 to the outer surface of the base body 10. The shortest distance between a portion 14A on the outer surface of the base body corresponding to the portion 14 where the foot portion starts to rise and a point 42A where the perpendicular line meets with the outer surface of the base body 10 corresponds to the width of the foot portion.

The above cross portion is where the surface of the foot portion and the surface of the thick-wall portion meet as described above. When the surface of the foot portion and the surface of the thick-wall portion meet too smoothly, the cross portion may be unclear. In such a case, the outline of the foot portion and the outline of the thick-wall portion may constitute a line, and this line may have an inflection point. This inflection point is on the cross portion. When no inflection point is found, a tangential line to the base body surface is drawn in that portion of the base body where the foot portion starts to rise, and a line whose gradient to the tangential line is $\frac{1}{2}$ is drawn at the portion of the base body where the foot portion starts to rise. This line crosses a combination of the outline of the foot portion and the outline of the thick-wall portion, and this cross point is on the cross portion.

The hollow portion is formed at least in the thick-wall portion, and it may extend into the foot portion and/or the base body.

In the preferred embodiment of the injection-molded article of the present invention, the outline of the foot portion at right angles with a longitudinal direction of the thick-wall portion, shown by its cross-sectional view, may be a straight line, a curved line, a stepwise, changing line or a combination of at least two of these. When the thickness of that portion of the base body where the foot portion starts to rise is taken as t, the width of the foot portion is preferably 1.5 t to 50 t.

When the width of the foot portion is less than 1.5 t, the area of the foot portion is too small. When it is more than 50 t, the area of the foot portion is too large. In these cases, a strain or an irregular color may stand out on the product surface portion.

The thick-wall portion may have a cross-sectionally rib form, or a rib may be formed on the thick-wall portion. The thick-wall portion is a portion where a pressurized gas flows, and it is what is called a gas channel. The base body may have a corner portion, and the thick-wall portion and the foot portion may be formed in the corner portion (see FIGS. 16A and B for example).

Although no special limitation is imposed, the thermoplastic resin used for producing the injection-molded article of the present invention is selected not only from so-called general-purpose plastics typified by a polyolefin resin, a polystyrene resin, an ABS resin, an AS resin, a PVC resin, a methacrylic resin and a fluorine-containing resin but also from engineering plastics typified by a nylon resin, a saturated polyester resin, a polycarbonate resin, a polyacrylate resin, a polyacetal resin, a polysulfone resin and a modified polyphenylene ether resin.

The thermoplastic resin used in the present invention may contain a reinforcing fiber, a filler or a stabilizer as required.

In the production of the injection-molded article of the present invention, a variety of conditions such as the amount, pressure, temperature and velocity of a molten resin, the amount, pressure and velocity of a pressurized gas and the cooling time need to be properly selected and controlled depending upon the kind of a resin used and the form of a mold, and cannot be uniformly determined.

In the injection-molded article of the present invention, the cross-sectional form and dimension of the foot portion, or the form and dimension of the outline of the foot portion are not uniformly determined, either. These forms and dimensions may be properly changed depending upon the form and cross-sectional form of an intended injection-molded article and a material used. Specifically, the appearance quality of an injection-molded article changes depending upon the state of an embossed pattern of an injection-molded article surface, the thickness of a coating, the state of the pretreatment for coating, the kind of a resin used, an additive incorporated into the resin or a shrinkage factor in molding. Therefore, the cross-sectional form and dimension of the foot portion or the form and dimension of the outline of the foot portion need to be properly selected to suit those conditions. However, it can prevent the occurrence of a strain or an irregular color on the product surface portion of an injection-molded article if the above forms and dimensions are properly selected. As a result, there can be industrially produced injection-molded articles satisfying a high appearance quality such as exterior parts including a fender, a door, a bumper and a spoiler for an automobile and housings and covers having glossy surface for business machines and electric household appliances.

The following will briefly explain why the injection-molded article of the present invention is free of a strain and an irregular color on the product surface portion.

Having a hollow portion at least in the thick-wall portion, the injection-molded article of the present invention can prevent the occurrence of a sink mark like a conventional injection-molded article having a hollow portion. However, a conventional injection molding technique of merely forming a hollow portion in the thick-wall portion without forming any foot portion is not sufficient to prevent a strain and an irregular color on the product surface portion.

When a molten resin is injected or when a pressurized gas is introduced, the molten resin flows from a mold cavity portion for forming the thick-wall portion to a mold cavity portion for forming the base body. The injection-molded article of the present invention has the foot portion, which eventually decreases a change ratio of the flow state of the molten resin flowing in the mold cavity and decreases a disorder in the molten resin flow relative to the cavity wall. As a result, the occurrence of a strain and an irregular color on the product surface portion can be prevented. Meanwhile, in a conventional injection molding technique, the flow state of a molten resin greatly changes in the mold cavity to cause a great disorder in the molten resin flow, and a strain or an irregular color greatly stand out on the product surface portion.

FIGS. A to C are schematic cross-sectional view of a conventional injection-molded article provided with a projection portion having a hollow portion.

DESCRIPTION OF THE PREFERRED EMBODIMENTS

EXAMPLE 1

Figure 1A:
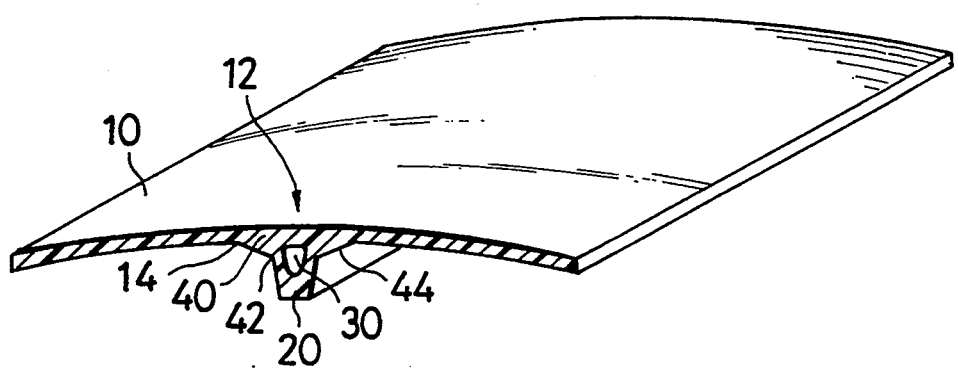
FIGS. 1A to C show a perspective view of an injection-molded article obtained in Example 1 of the present invention, sectioned at right angles with its length direction, its schematic cross-sectional view and its schematic side view.
Figure 1B:
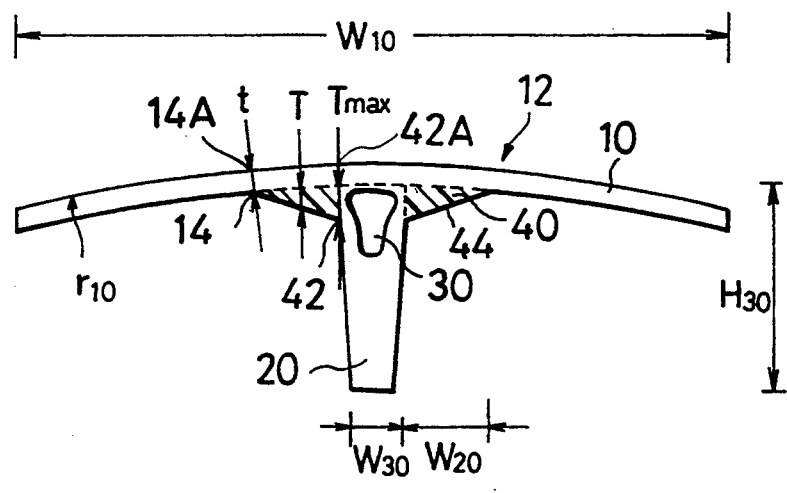
Figure 1C:
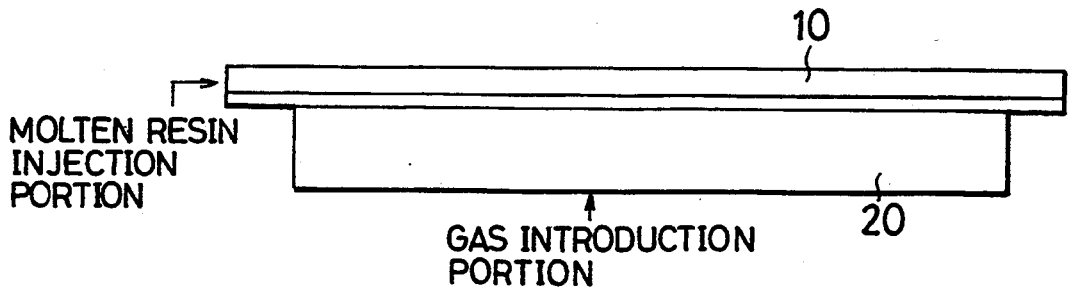

A molten resin of a polycarbonate resin (trade name: IUPILON S3000, supplied by Mitsubishi Gas Chemical Company, Inc.) was injected into a mold cavity under the conditions shown in Table 1, and then a nitrogen gas was introduced into that portion of the molten resin which corresponded to a thick-wall portion to form a hollow portion in the thick-wall portion. Then the molten resin was cooled and solidified to give an injection-molded article shown in FIGS. 1A to C. FIG. 1A is a perspective view of the injection-molded article sectioned at right angles with a longitudinal direction of the thick-wall portion. FIG. 1C is a side view of the injection-molded article. The nitrogen gas had been introduced into the molten resin through a mold portion corresponding to that portion of the article which is indicated by an arrow with a note of "gas injection portion" in the side view of FIG. 1C. The molten resin had been injected into the mold cavity through a mold portion corresponding to that portion of the article which is indicated by an arrow with a note of "molten resin injection portion" in the side view of FIG. 1C. Incidentally, in each of Examples 2 to 4 and Comparative Examples 1 to 4, a molten resin was injected through a mold portion corresponding to the above-specified, and a nitrogen gas was introduced through a mold portion corresponding to the above-specified.

As shown in the perspective view of FIG. 1A, the injection-molded article had a base body 10 defining the outer shape of the article, a thick-wall portion 20 rising from the base body 10, and a foot portion 40 formed on the base body 10 and at the foot of the thick-wall portion 20. The thick-wall portion 20 had a rib form to strengthen the article. The foot portion 40 started to rise from the base body 10, and its thickness, T, gradually increased up to a cross portion 42. The surface of the foot portion 40 met the surface of the thick-wall portion 20 in the cross portion 42. Numeral 14 indicates that portion of the base body 10 where the foot portion 40 started to rise. A hollow portion 30 was formed in the thick-wall portion 20. FIG. 1B is a schematic cross-sectional view of the article, in which the foot portion is indicated by hatching and other portions are not hatched for clearly showing the cross section of the article. The schematic cross-sectional view of FIG. 1B shows an interface between the base body 10 and the foot portion 40 and an interface between the foot portion 40 and the thick-wall portion 20 by dotted lines.

Table 2 shows dimensions, etc., of portions of the injection-molded article shown in the cross-sectional view of FIG. 1B. The thickness, t, of the base body was 3.0 mm. The maximum thickness/width ($T_{max}/W_{20}$) ratio of the foot portion was 2 mm/12 mm=1/6. The width, $W_{20}$, of the foot portion was 12 mm=4 t (4 times the thickness of the base body).

In this Example 1, the foot portion 40 had a straight outline 44 at the right angles with the longitudinal direction of the thick-wall portion. The maximum thickness, $T_{max}$, was determined by drawing a perpendicular line from the cross portion 42 to the outer surface 12 of the base body, and deducting t from the length of the perpendicular line.

The thick-wall portion 20 had a cross-sectionally nearly trapezoidal form. The thick-wall portion 20 had a minimum width of 6 mm, and the thickness, $W_{30}$, of the cross portion of the thick-wall portion was 9 mm. The thick-wall portion 20 had a height, $H_{30}$, of 25 mm. As described already, the cross portion 42 can be recognized as a line formed when the surface 44 of the foot portion 40 meets the surface of the thick-wall portion 20.

In the product surface portion of the injection-molded article obtained in this Example 1, neither a strain nor an irregular color was observed. The outer surface of the base body 10 of the article was coated with a black glossy coating having a thickness of 20 μm to give an excellent appearance.

Comparative Example 1

Figure 2:
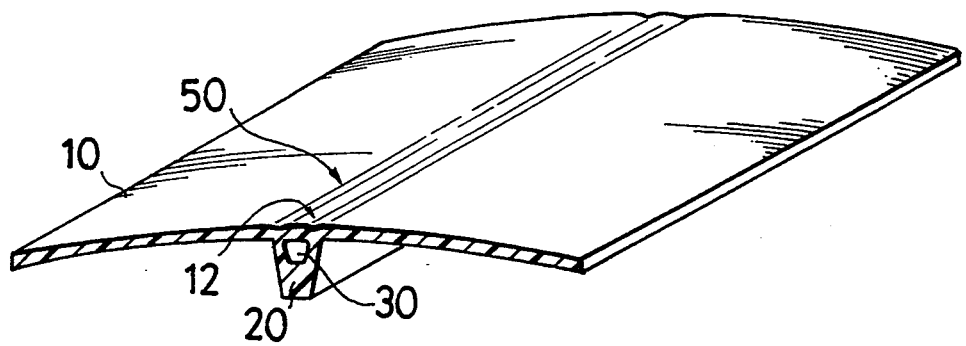
FIG. 2 is a perspective view of an injection-molded article with a rib having a hollow portion, obtained in Comparative Example 1, sectioned at right angles with its length direction.

Example 1 was repeated except that the mold was replaced with a different mold (which had no cavity portion to form a foot portion) to give an injection-molded article. FIG. 2 is a perspective view of the article sectioned at right angles with its length direction. The article had a thick-wall portion 20 in which a hollow portion was formed, while the article, differing from the article obtained in Example 1, had no foot portion. The thick-wall portion 20 had a cross-sectionally nearly trapezoidal form. The forms and dimensions of its base body 10, thick-wall portion 20 and hollow portion 30 were the same as those in Example 1.

In the above-obtained article, a linear strain 50 as shown in FIG. 2 and an irregular color were observed on the product surface portion. The outer surface of the base body 10 was coated with a black glossy coating having a thickness of 20 μm. However, the strain did not disappear, and the appearance of the article was defective.

EXAMPLE 2

Figure 3:
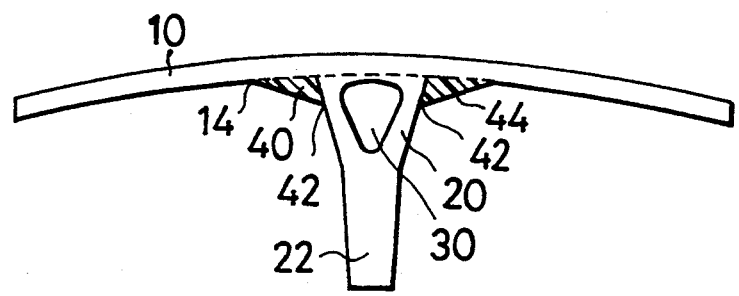
FIG. 3 is a schematic partial cross-sectional view of an injection-molded article obtained in Example 2 of the present invention.

A molten resin of a modified polyphenylene ether resin (trade name: IUPIACE NX7000, supplied by Mitsubishi Gas Chemical Company, Inc.) was injected into a mold cavity under the conditions shown in Table 1, and then a nitrogen gas was introduced into that portion of the molten resin which corresponded to a thick-wall portion to form a hollow portion in the thick-wall portion. Then the molten resin was cooled and solidified to give an injection-molded article whose cross section is schematically shown in FIG. 3.

Table 2 shows dimensions, etc., of portions of the above-obtained injection-molded article. The article had a thick-wall portion 20, on which a rib 22 was formed. The thick-wall portion 20 and the rib 22 as a combination had a cross-sectionally nearly trapezoidal form made by stacking two trapezoids.

Figure 4:
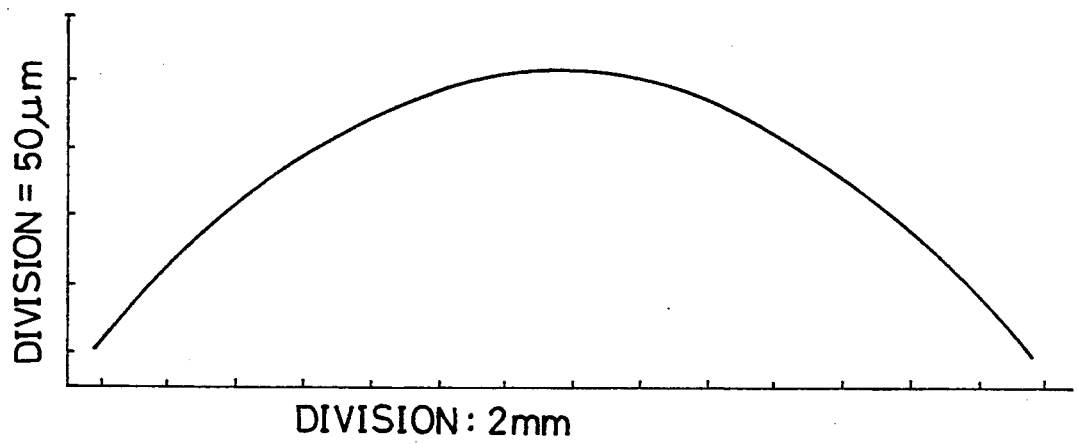
FIG. 4 shows a graph prepared by plotting part of the base body surface of the injection-molded article obtained in Example 2 of the present invention.
Figure 10:
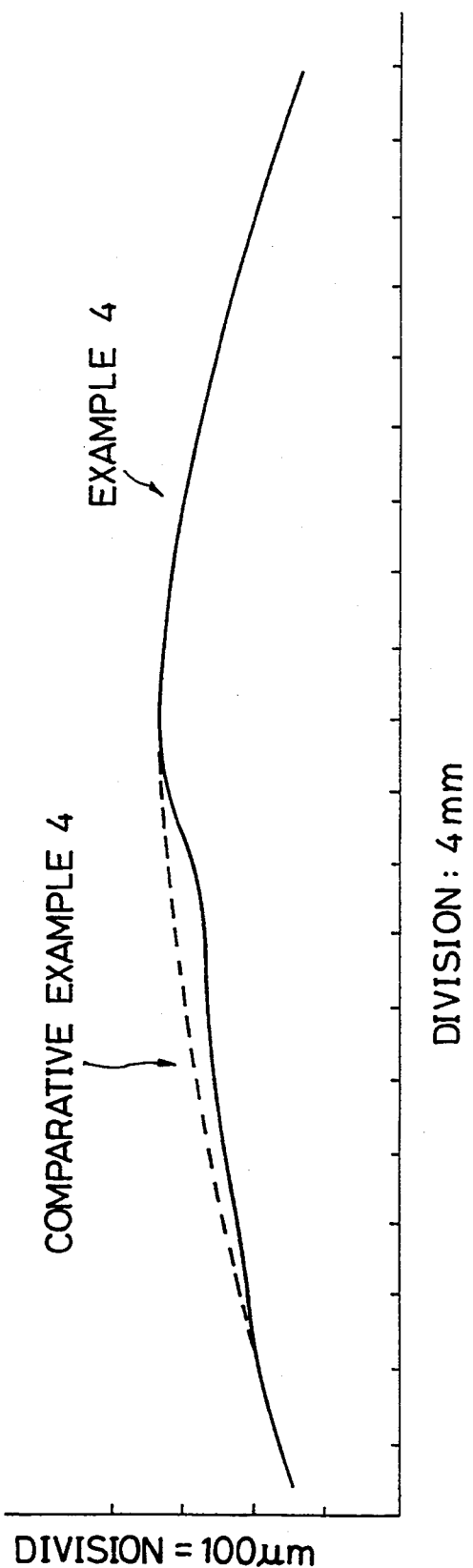
FIG. 10 is a graph prepared by plotting part of designed forms of base body surfaces and the forms of the base body surfaces of injection-molded articles obtained in Example 4 of the present invention and Comparative Example 4.

FIG. 4 shows a graph prepared by plotting part of the outer surface of the base body 10 of the injection-molded article. The graph was drawn at 5 times in the horizontal direction and at 200 times in the perpendicular direction. Incidentally, all the graphs except for the graph in FIG. 10 were also drawn to the same scale as above. In FIG. 10, the graph was drawn at 2.5 times in the horizontal direction and at 100 times in the perpendicular direction.

The form of the base body surface of the above-obtained injection-molded article very accurately agreed with a designed form, and neither a strain nor an irregular color was observed on the product surface portion.

Comparative Example 2

Figure 5:
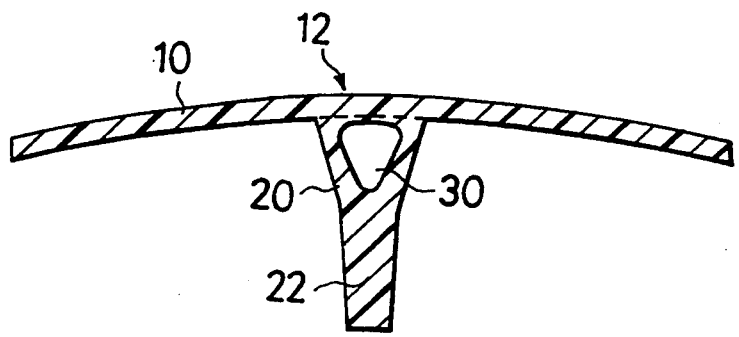
FIG. 5 is a schematic partial cross-sectional view of an injection-molded article obtained in Comparative Example 2.

Example 2 was repeated except that the mold was replaced with a different mold (which had no cavity portion to form a foot portion) to give an injection-molded article. FIG. 5 is a perspective view of the injection-molded article sectioned at right angles with its length direction. That is, the article had a thick-wall portion 20 in which a hollow portion was formed and a rib 22, while, the article, differing from the article of Example 2, had no foot portion. The forms and dimensions of its base body 10, thick-wall portion 20, rib 22 and hollow portion 30 were the same as those in Example 2.

Figure 6:
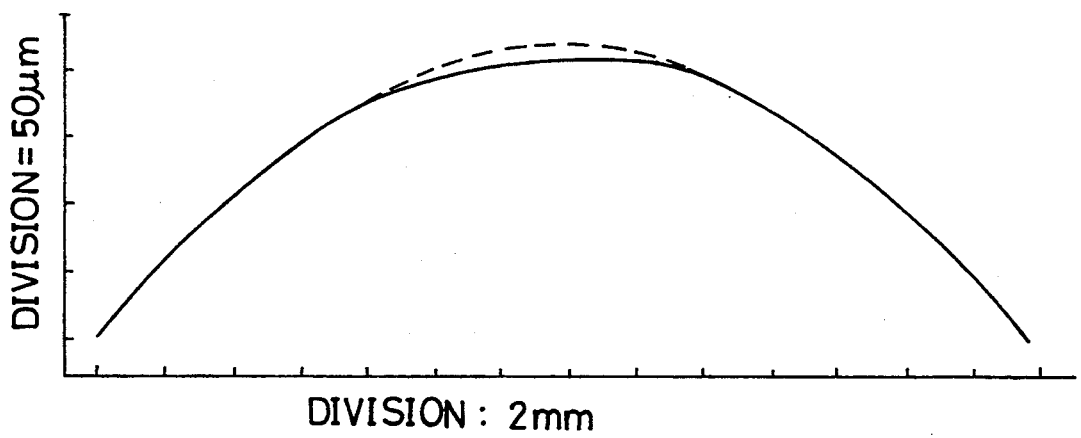
FIG. 6 is a graph prepared by plotting part of the designed form of a base body surface and the form of the base body surface of an injection-molded article obtained in Comparative Example 2.

In FIG. 6, a solid line shows a graph prepared by plotting part of the outer surface of the base body 10 of the injection-molded article, and a dotted line shows a graph of a designed form of the outer surface of the base body. As shown in FIG. 6, the form of the outer surface of the base body of the above-obtained article deviated from the designed form, and a strain and an irregular color were observed on the product surface portion. That is, the article had a defective appearance.

EXAMPLE 3

A molten resin of a modified polyphenylene ether resin (trade name: IUPIACE NX7000, supplied by Mitsubishi Gas Chemical Company, Inc.) was injected into a mold cavity under the conditions shown in Table 1, and then a nitrogen gas was introduced into that portion of the molten resin which corresponded to a thick-wall portion to form a hollow portion in the thick-wall portion. Then the molten resin was cooled and solidified to give an injection-molded article whose cross section is schematically shown in FIG. 3 and which was similar to the article obtained in Example 2.

Table 2 shows dimensions, etc., of portions of the above-obtained injection-molded article. Like the article obtained in Example 2, the above-obtained article had a thick-wall portion 20, on which a rib 22 was formed. The thick-wall portion 20 and the rib 22 had a cross-sectionally trapezoidal form. The article obtained in Example 3 was the same as the article obtained in Example 2 except that the t value differed.

Figure 7:
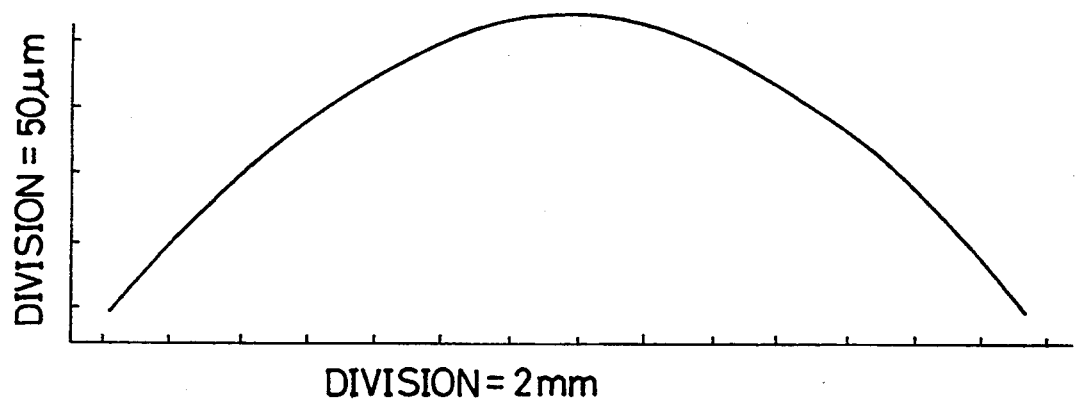
FIG. 7 is a graph prepared by plotting part of the base body surface of an injection-molded article obtained in Example 3 of the present invention.

FIG. 7 shows a graph prepared by plotting part of the outer surface of the base body 10 of the injection-molded article. The form of the base body surface of the above-obtained injection-molded article very accurately agreed with a designed form, and neither a strain nor an irregular color was observed on the product surface portion.

Comparative Example 3

Example 3 was repeated except that the mold was replaced with a different mold (which had no cavity portion to form a foot portion) to give an injection-molded article. The form of the article sectioned at right angles with its length direction was the same as that of the article obtained in Comparative Example 2 (see FIG. 5). That is, the article had a thick-wall portion 20 in which a hollow portion was formed and a rib 22, while, the article, differing from the article of Example 3, had no foot portion. The forms and dimensions of its base body 10, thick-wall portion 20, rib 22 and hollow portion 30 were the same as those in Example 3.

Figure 8:
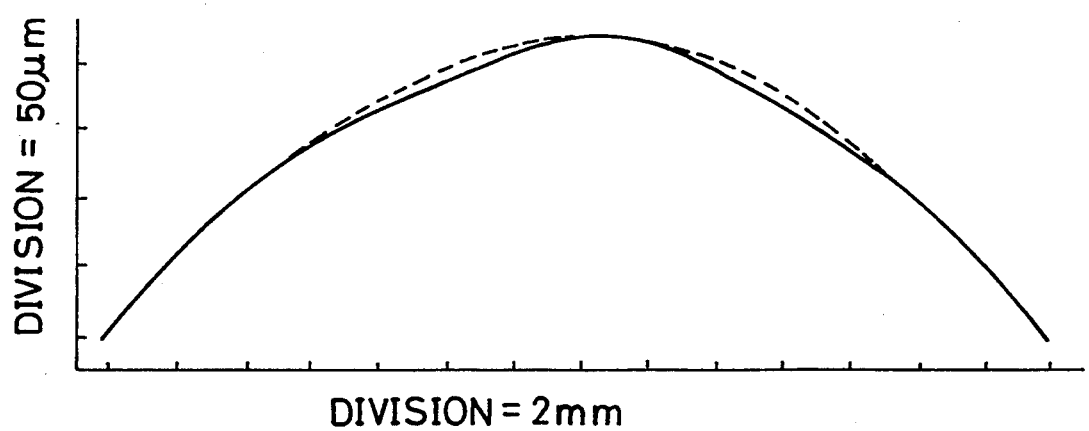
FIG. 8 is a graph prepared by plotting part of the designed form of a base body surface and the form of the base body surface of an injection-molded article obtained in Comparative Example 3.

In FIG. 8, a solid line shows a graph prepared by plotting part of the outer surface of the base body 10 of the injection-molded article, and a dotted line shows a graph of a designed form of the outer surface of the base body. As shown in FIG. 8, the form of the outer surface of the base body of the above-obtained article deviated from the designed form, and a strain and an irregular color were observed on the product surface portion. That is, the article had a defective appearance.

EXAMPLE 4

Comparative Example 4

Figure 9:
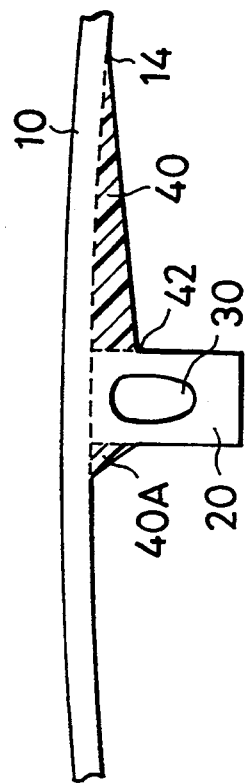
FIG. 9 is a schematic partial cross sectional view of injection-molded articles obtained in Example 4 of the present invention and Comparative Example 4.

A molten resin of a modified polyphenylene ether resin (trade name: IUPIACE NX7002, supplied by Mitsubishi Gas Chemical Company, Inc.) was injected into a mold cavity under the conditions shown in Table 1, and then a nitrogen gas was introduced into that portion of the molten resin which corresponded to a thick-wall portion to form a hollow portion in the thick-wall portion. Then the molten resin was cooled and solidified to give an injection-molded article whose cross section is schematically shown in FIG. 9. In this injection-molded article, the foot portion on the right hand side and the foot portion on the left hand side differed in form as shown in FIG. 9. The foot portion 40 on the right hand side as shown in FIG. 9 corresponded to the foot portion of Example 4, and the foot portion 40A on the left hand side as shown in FIG. 9 corresponded to the foot portion of Comparative Example 4.

In Example 4 (foot portion 40 in FIG. 9), the thickness, t, of the base body was 2.5 mm. The maximum thickness/width ($T_{max}/W_{20}$) ratio of the foot portion was 3 mm/60 mm=1/20. The width, $W_{20}$, of the foot portion was 60 mm=24 t. In Comparative Example 4 (foot portion 40A in FIG. 9), the thickness, t, of the base body was 2.5 mm. The maximum thickness/width ($T_{max}/W_{20}$) ratio of the foot portion was 3 mm/5 mm=0.6. The width, $W_{20}$, of the foot portion was 5 mm=2 t.

Table 2 shows dimensions, etc., of portions of the above-obtained injection-molded article. The thick-wall portion of the above-obtained article had a cross-sectionally rectangular form.

In FIG. 10, a solid line shows a graph prepared by plotting part of the outer surface of the base body 10 of the injection-molded article. The solid line on the right hand side in FIG. 10 corresponds to the article of Example 4, and the solid line on the left hand side corresponds to the article of Comparative Example 4. In Example 4, the form of the base body surface of the article very accurately agreed with a designed form, and neither a strain nor an irregular color was observed on the product surface portion. In Comparative Example 4, however, the form of the outer surface of the base body deviated from the designed form, and a strain and an irregular color were observed on the product surface portion. That is, the article had a defective appearance.

EXAMPLE 5

A molten resin of a modified polyphenylene ether resin (trade name: IUPIACE AV30, supplied by Mitsubishi Gas Chemical Company, Inc.) was injected into a mold cavity under the conditions shown in Table 1, and then a nitrogen gas was introduced into that portion of the molten resin which corresponded to a thick-wall portion to form a hollow portion in the thick-wall portion. Then the molten resin was cooled and solidified to give an injection-molded article whose cross section is schematically shown in FIG. 11.

Figure 11:
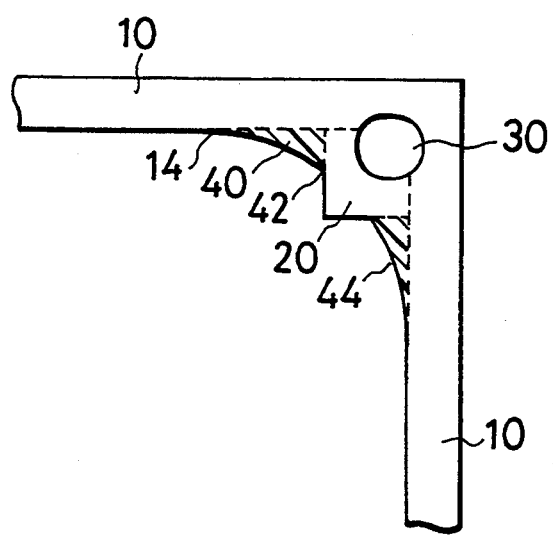
FIG. 11 is a schematic partial cross-sectional view of an injection-molded article obtained in Example 5 of the present invention.

As shown in FIG. 11, the above-obtained article had a base body 10 defining the outer shape of the article and forming a corner, a thick-wall portion 20 rising from the base body 10, and a foot portion 40 formed between the base body 10 and the thick-wall portion 20. The foot portion 40 started to rise from the base body 10 and its thickness gradually increased up to a cross portion 42. In the cross portion 42, the surface of the foot portion 40 met the surface of the thick-wall portion 20. A hollow portion 30 was formed in the thick-wall portion 20. In FIG. 11, the foot portion 40 is indicated by hatching and other portions are not hatched for clearly showing the cross section of the article. The interface between the base body 10 and the foot portion 40 and the interface between the foot portion 40 and the thick-wall portion 20 are indicated by dotted lines. Each of the base body 10, the foot portions 40 and the thick-wall portion 20 had a symmetrical form. A hollow portion 30 was formed in the thick-wall portion 20.

Table 2 shows dimensions, etc., of portions of the above-obtained injection-molded article. In the article, the thickness, t, of the base body was 3.0 mm. The maximum thickness/width ($T_{max}/W_{20}$) ratio of the foot portion was 1.25 mm/8.0 mm=25/100. The width, $W_{20}$, of the foot portion was 5.0 mm=1.7 t.

The thick-wall portion had a cross-sectionally square form whose sides are 5.0 mm long each. The outline 44 of the foot portion 40 at right angles with the longitudinal direction of the thick-wall portion was an arc of a circle having a radius of 10 mm.

Neither a strain nor an irregular color was observed on the product surface portion.

Comparative Example 5

Figure 12:
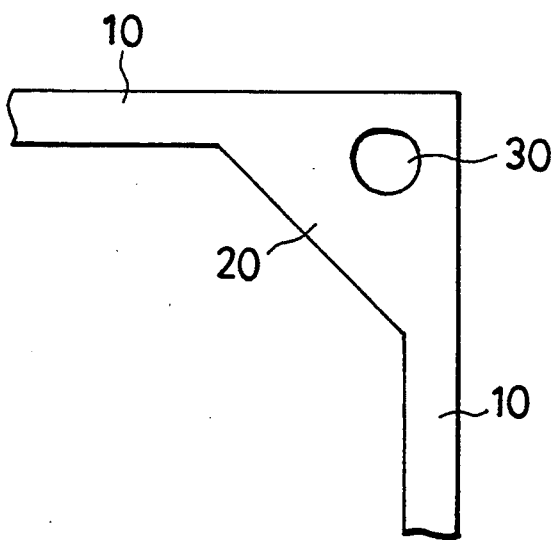
FIG. 12 is a schematic partial cross-sectional view of an injection-molded article obtained in Comparative Example 5.
Figure 13A:
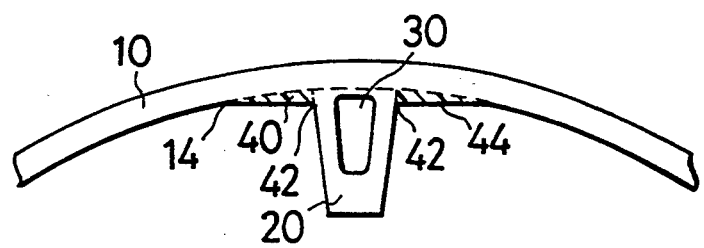
FIGS. 13A to D, 14A to C, 15A to D and 16A and B are schematic cross-sectional views of other preferred embodiments of the injection-molded article of the present invention.
Figure 13B:
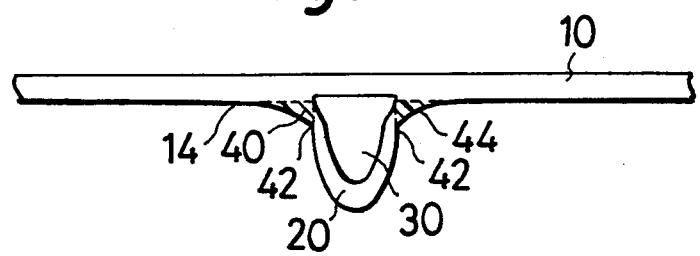
Figure 13C:
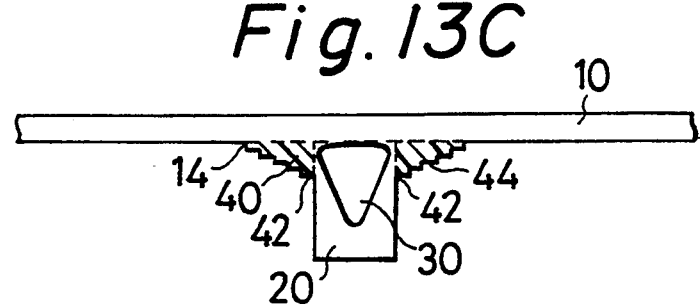
Figure 13D:
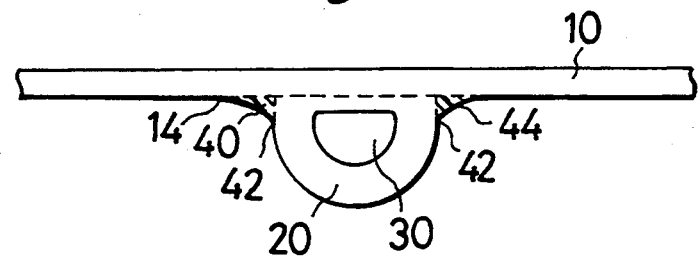

Example 5 was repeated except that the mold was replaced with a different mold (which had no cavity portion to form a foot portion) to give an injection-molded article. FIG. 12 is a schematic cross-sectional view of the article. That is, the article had a thick-wall portion 20 in which a hollow portion was formed, while, the article, differing from the article of Example 5, had no foot portion. The thick-wall portion 20 had a cross-sectionally nearly right-angled, isosceles triangle form. Table 2 shows dimensions, etc., of portions of the above-obtained injection-molded article.

A strain and an irregular color were observed on the product surface portion. That is, the article had a defective appearance.

The injection-molded article of the present invention has been explained above with reference to preferred embodiments. However, the present invention shall not be limited thereto.

The injection-molded article of the present invention may have a variety of cross-sectional forms. For, example, as shown in FIGS. 13A to D, the outline 44 of the foot portion 40 at right angles with the longitudinal direction of the thick-wall portion may be a straight line (see FIG. 13A), an arc (see FIG. 13B), a stepwise changing line (see FIG. 13C) and an elliptical line (see FIG. 13D). It may also be a curved line such as a parabolic line. It may also be a combination of at least two of these.

As shown in FIG. 13A to D, the cross section of the thick-wall portion 20 may have a polygonal form such as a rectangular form (see FIG. 13C), an elliptical form (see FIG. 13B), a semi-circular (see FIG. 13D) and any other curved form. It may have a combination of at least two of these.

The hollow portion 30 may extend into the base body 10 or the foot portion 40.

The cross sections of the injection-molded articles shown in FIG. 13 are symmetrical with regard to an imaginary line passing the center of the thick-wall portion. The cross portion 42 of each of the articles of FIGS. 13A, 13B and 13C is clearly recognized, while the cross portion 42 of the article of FIG. 13D is ambiguous. In FIG. 13D, the outline of the foot portion is elliptical, and the outline of the thick-wall portion is semi-circular. These outlines meet smoothly. The point where these two lines meet is an inflection point, and the inflection point constitutes a cross portion 42.

The cross-sectional form of the base body 10 of the injection-molded article of the present invention is not limited to an arc form, and the base body may have a planar surface and any other curved surface. Naturally, the injection-molded article may have a plurality of thick-wall portions.

Figure 14A:
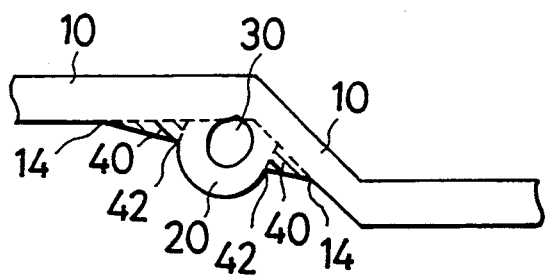
Figure 14B:
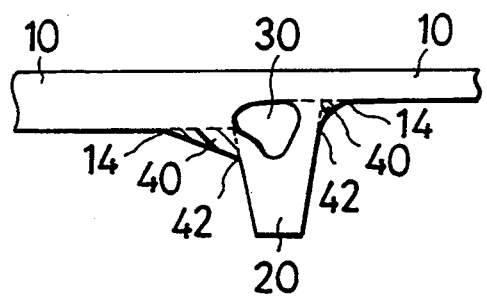
Figure 14C:
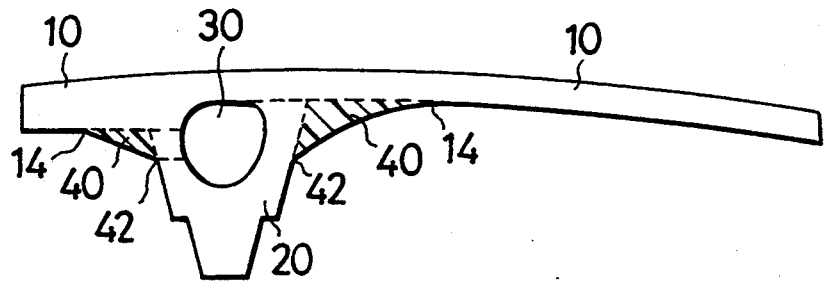

Further, the cross-sectional form of the injection-molded article may be asymmetrical with regard to an imaginary line passing the center of the thick-wall portion, as schematically shown in FIGS. 14A, 14B and 14C. That is, any one of the foot portion, thick-wall portion and base portion may be asymmetrical. In this case, it is sufficient to satisfy the conditions that each foot portion rises from the base body, that the thickness of each foot portion gradually increases toward the thick-wall portion, and that the maximum thickness/width Patio of each foot portion is 1/40 to ½.

Figure 15A:
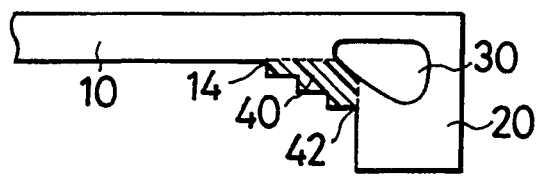

The present invention also includes a case where the foot portion and the base body are formed only on one side of the thick-wall portion as shown in FIG. 15A.

Figure 15B:
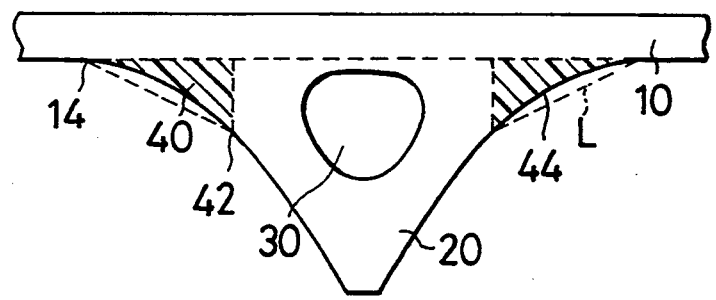

The present invention includes another case where the outline of the foot portion 40 and the outline of the thick-wall portion 20 smoothly meet to be free of an inflection point as shown in FIG. 15B. In this case, a tangential line on a point 14 where the foot portion starts to rise is drawn from the base body surface, and a straight line L, having a gradient of ½ with regard to the tangential line is drawn from the point 14. This straight line L crosses a combination of the outlines of the foot portion and the thick-wall portion, and this cross point is on a cross portion 42.

Figure 15C:
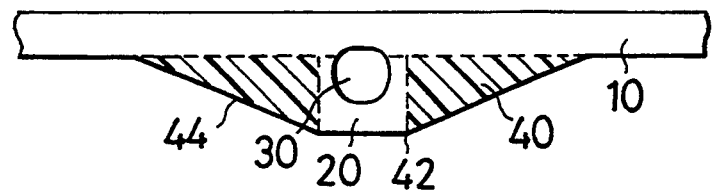
Figure 15D:
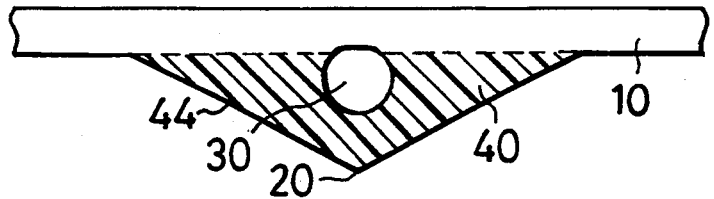

The present invention further includes another case where the maximum thickness of the foot portion 40 and the height of the thick-wall portion 20 equal each other as shown in FIG. 15C. The present invention includes still further another case where the width of the thick-wall portion is zero and the foot portion and the thick-wall portion are not distinguishable as shown in FIG. 15D.

Figure 16A:
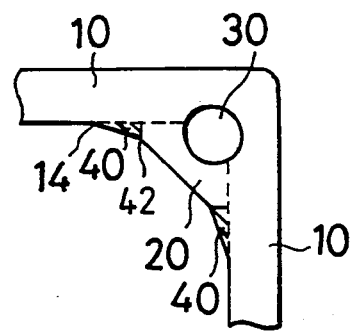

Further, the present invention includes an injection-molded article in which the base body forms a corner and the foot portion is formed in the corner as shown in FIGS. 16A and B. In this case, it is sufficient to satisfy the conditions that each foot portion rises from the base body, that the thickness of each foot portion gradually increases toward the thick-wall portion, and that the maximum thickness/width ratio of each foot portion is 1/40 to ½. The cross-sectional form of the injection-molded article may be symmetrical with regard to an imaginary line (not shown) in FIGS. 16A and B or asymmetrical (not shown). That is, any one of the foot portion, the thick-wall portion and the base body may be symmetrical or asymmetrical.

Figure 16B:
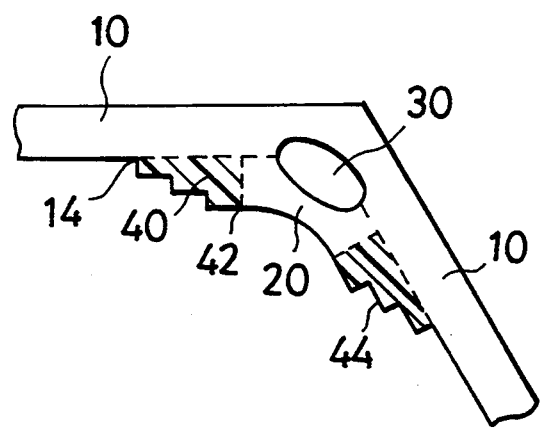
Figure 17A:
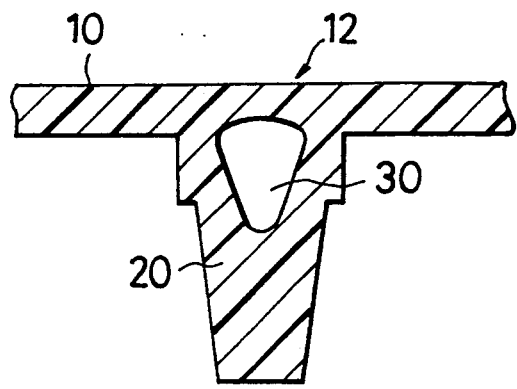
Figure 17B:
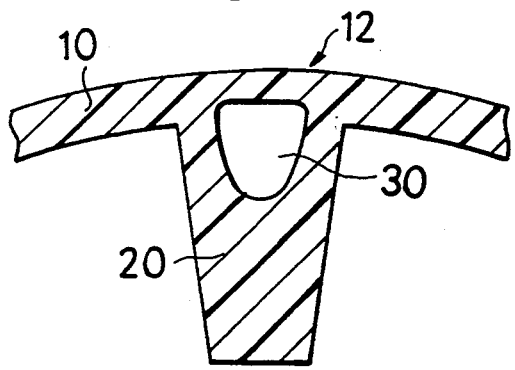
Figure 17C:
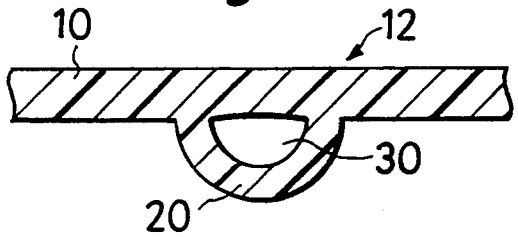

In FIGS. 16A and B, for example, the outline 44 of the foot portion at right angles with the longitudinal direction of the thick-wall portion is a straight line in FIG. 16A, and a stepwise-changing line in FIG. 16B. It is arc in FIG. 11. The outline 44 of the foot portion 40 may also be any one of curved lines such as a parabolic line, or a combination of any one of these including a combination of a straight line with a curved line. The outline of the thick-wall portion 20 may have the form of a polygon such as a combination of two straight lines (see FIG. 11), a straight line (see FIG. 16A), any curved line such as an arch (see FIG. 16B), or a combination of these. Further, the hollow portion 30 may extend into the base body 10. The cross-sectional form of the base body is not limited to a planar form, and it may have an arc form or an any curved form. Naturally, the injection-molded article may have a plurality of corners.

When the base body has a corner, the cross portion sometimes corresponds to an inflection point of a combination of the outlines of the foot portion and the thick-wall portion. Further, the outline of the foot portion and the outline of the thick-wall portion meet too smoothly to have any inflection point. In this case, a tangential line on a point where the foot portion starts to rise is drawn from the base body surface, and a straight line having a gradient of ½ with regard to the tangential line is drawn from the above point. This straight line crosses a combination of the outlines of the foot portion and the thick-wall portion, and this cross point is on a cross portion.

As described above, due to the foot portion, the injection-molded article of the present invention is free from the occurrence of a strain and an irregular color on the product surface portion, and can have an excellent appearance quality. The injection-molded article of the present invention can be applied to an article coated with a glossy coating and an article having a glossy surface, and can be used in industrial fields where high appearance qualities are severely required.

TABLE 1

| Injection conditions | unit | Example-1 | Example-2 | Example-3 | Example-4 | Example-5 |
|---|---|---|---|---|---|---|
| Resin temperature | °C. | 300 | 280 | 280 | 290 | 270 |
| Injection pressure | kg/cm$^2$ | 1120 | 1120 | 1050 | 1320 | 1050 |
| Injection time | sec | 3.0 | 2.7 | 3.2 | 4.5 | 3.7 |
| Mold temperature | °C. | 100 | 80 | 80 | 90 | 70 |
| Gas holding pressure | kg/cm$^2$ | 80 | 90 | 90 | 80 | 120 |
| Gas introduction time | sec | 72 | 65 | 70 | 75 | 60 |

TABLE 2

Dimensions of portions of injection-molded articles

| | unit | Example-1 | Comparative Example-1 | Example-2 | Comparative Example-2 | Example-3 | Comparative Example-3 |
|---|---|---|---|---|---|---|---|
| Base body | | | | | | | |
| Thickness (t) | mm | 3.0 | 3.0 | 2.5 | 2.5 | 3.5 | 3.5 |
| Form | | Curved $r_{10}$ = 200 mm | Curved $r_{10}$ = 200 mm | Curved $r_{10}$ = 400 mm | Curved $r_{10}$ = 400 mm | Curved R = 400 mm | Curved R = 400 mm |
| Foot portion | | | | | | | |
| Maximun ($T_{max}$) thickness | mm | 2.0 | — | 2.0 | — | 2.0 | — |
| Maximum width ($W_{20}$) | mm | 12 (4t) | — (—) | 20 (8t) | — (—) | 15 (4.3t) | — (—) |
| Outline | | straight | — | straight | — | straight | — |
| $T_{max}/W_{20}$ | | 1/6 | — | 1/10 | — | 2/15 | — |
| Thick wall portion | | | | | | | |
| Minimum width | mm | 6 | 6 | 5.0 | 5.0 | 5.0 | 5.0 |
| Width ($W_{30}$) | mm | 9 | 9 | 10 | 10 | 10 | 10 |
| Height ($H_{30}$) | mm | 25 | 25 | 25 | 25 | 25 | 25 |
| Form | | trapezoidal | trapezoidal | trapezoidal | trapezoidal | trapezoidal | trapezoidal |

| | unit | Example-4 | Comparative Example-4 | Example-5 | Comparative Example-5 |
|---|---|---|---|---|---|
| Base body | | | | | |
| Thickness (t) | mm | 2.5 | 2.5 | 3.0 | 3.0 |
| Form | | Curved $r_{10}$ = 700 mm | Curved $r_{10}$ = 700 mm | Corner | Corner |
| Foot portion | | | | | |
| Maximun ($T_{max}$) thickness | mm | 3.0 | 3.0 | 1.25 | — |
| Maximum width ($W_{20}$) | mm | 60 (24t) | 3 (1.2t) | 5.0 (1.7t) | — (—) |
| Outline | | straight | straight | arc r = 10 mm | — |
| $T_{max}/W_{20}$ | | 1/20 | 1/1 | 1/4 | — |
| Thick wall portion | | | | | |
| Minimum width | mm | 7.0 | 7.0 | 5.0 | 7.0 |
| Width ($W_{30}$) | mm | 7.5 | 7.5 | 5.0 | 7.0 |
| Height ($H_{30}$) | mm | 9.0 | 9.0 | 5.0 | 7.0 |
| Form | | rectangular | rectangular | rectangular | triangular |

What is claimed is:

1. An injection-molded article having a base body defining an outer shape of the injection-molded article, a thick-wall portion rising from the base body, and a foot portion formed on the base body and at the foot of the thick-wall portion, the injection-molded article formed by injection-molding a thermoplastic resin, the foot portion rising from the base portion, having a thickness which gradually increases toward the thick-wall portion, and having a $T_{max}/W_{20}$ ratio of 1/40 to ½, wherein $T_{max}$ is a maximum thickness of the foot portion and $W_{20}$ is a width extending from the thick-wall portion to an end of the foot portion, ratio of 1/40 to ½, at least the thick-wall portion having a hollow portion.

2. The article according to claim 1, wherein the $T_{max}/W_{20}$ ratio is 1/20 to ¼.

3. The article according to claim 1, wherein the foot portion has an outline of a straight line, a curved line, a stepwise-changing line or a combination of these at right angles with a longitudinal direction of the thick-wall portion.

4. The article according to claim 3, wherein the foot portion has a width of 1.5 t to 50 t, t being a thickness value of that portion of the base body where the foot portion starts to rise.

* * * * *